(12) United States Patent
Pividori

(10) Patent No.: US 11,708,037 B2
(45) Date of Patent: Jul. 25, 2023

(54) VEHICLE CONTROL DEVICE AND WIRELESS COMMUNICATION NETWORK

(71) Applicant: Marcelo Roberto Pividori, Prov. Santa Fe (AR)

(72) Inventor: Marcelo Roberto Pividori, Prov. Santa Fe (AR)

(73) Assignee: SOLUCIONES INTEGRALES DE INGENIERIA Y DESARROLLO S.R.L., Santa Fe (AR)

( * ) Notice: Subject to any disclaimer, the term of this patent is extended or adjusted under 35 U.S.C. 154(b) by 477 days.

(21) Appl. No.: 16/754,293

(22) PCT Filed: Oct. 29, 2018

(86) PCT No.: PCT/EP2018/079550
§ 371 (c)(1),
(2) Date: Apr. 7, 2020

(87) PCT Pub. No.: WO2019/086373
PCT Pub. Date: May 9, 2019

(65) Prior Publication Data
US 2020/0307473 A1    Oct. 1, 2020

(30) Foreign Application Priority Data

Nov. 3, 2017    (AR) .......................... AR20170103065

(51) Int. Cl.
*B60R 16/023*        (2006.01)
*B60W 40/09*         (2012.01)
(Continued)

(52) U.S. Cl.
CPC ........... *B60R 16/023* (2013.01); *B60W 40/09* (2013.01); *G07C 5/008* (2013.01); *G07C 5/085* (2013.01);
(Continued)

(58) Field of Classification Search
CPC ......... H04L 12/40; H04L 2012/40267; H04W 88/085; H04W 4/80; B60R 16/023; B60W 40/09
See application file for complete search history.

(56) References Cited

U.S. PATENT DOCUMENTS 6,892,131 B2    5/2005  Coffee et al.
7,327,280 B2    2/2008  Bachelder et al.
(Continued)

FOREIGN PATENT DOCUMENTS

CN    102469140    5/2012
CN    205632356    10/2016
CN    106652437    5/2017

*Primary Examiner* — Min Jung
(74) *Attorney, Agent, or Firm* — Defillo & Associates, Inc.; Evelyn A. Defillo

(57) ABSTRACT

A vehicle control device including a microcontroller, a wifi/bluethoot device, a voltage stabilizer circuit and a voltage protector circuit, a battery and a battery charge control circuit, an analogue-digital bus can adapter circuit of transceiver type, an optical-digital signal adapter, a radiofrequency (rf) module, an external antenna adapter circuit and a non-volatile data storage device (rom) that allows the generation of an internal and an external wireless network at the same time and connection with other devices, to make control, warning, management and storage of driver's data and his driving style, his load and related units in real-time, and the interrelation with other vehicles that also have the device, for communication.

7 Claims, 5 Drawing Sheets

(51) Int. Cl.
    *G07C 5/00*     (2006.01)
    *G07C 5/08*     (2006.01)
    *H04L 12/40*     (2006.01)
    *H04W 88/08*     (2009.01)
    *H04W 4/80*     (2018.01)

(52) U.S. Cl.
    CPC ........... *H04L 12/40* (2013.01); *H04W 88/085* (2013.01); *H04L 2012/40267* (2013.01); *H04W 4/80* (2018.02)

(56) References Cited

U.S. PATENT DOCUMENTS

| | | | |
|---|---|---|---|
| 7,813,843 B2 | 10/2010 | Patel et al. | |
| 10,009,289 B2 * | 6/2018 | Maise | H04L 47/801 |
| 10,897,469 B2 * | 1/2021 | Hirshberg | G06F 15/16 |
| 2007/0073457 A1 * | 3/2007 | Lee | E02F 9/26 |
| | | | 701/50 |
| 2011/0080312 A1 * | 4/2011 | Oh | G08G 1/163 |
| | | | 342/125 |
| 2015/0198948 A1 | 7/2015 | Godley | |
| 2017/0041764 A1 * | 2/2017 | Nizgoda | H04M 1/72463 |
| 2017/0197505 A1 * | 7/2017 | Ferguson | B60K 23/08 |
| 2017/0309098 A1 * | 10/2017 | Watters | H04W 4/80 |
| 2018/0056988 A1 * | 3/2018 | Heil, Jr. | E05F 15/70 |
| 2018/0063246 A1 * | 3/2018 | Vangelov | H04L 12/40013 |
| 2019/0080691 A1 * | 3/2019 | Meng | G10L 15/22 |

* cited by examiner

VEHICLE CONTROL DEVICE AND WIRELESS COMMUNICATION NETWORK

CROSS REFERENCE TO RELATED APPLICATION

This application is a national stage entry of PCT/EP2018/079550 filed Oct. 29, 2018, under the International Convention claiming priority over Argentinean Patent Application No. AR20170103065 filed Nov. 3, 2017.

FIELD OF THE INVENTION

The present patent of invention refers to a vehicle control device and a wireless communication network.

It is well known that at present, with the existing technological developments, air, land, sea and/or rail transport units are equipped with multiple controls and with sensing of different internal and external parts thereof.

In fact, in land transport, and more precisely in a car, there are different internal devices that are commanded and/or controlled by a central computer generally named ECU. The purpose of this central computer is to receive all data from the sensors that are in the vehicle and at the same time control actuators to modify any status thereof. The type of communication that these units have with all the devices to be sensed or commanded is generally the CAN. Each vehicle differs from the amount of sensors or actuators that it has, and it is further equipped with a diversity of devices for comfort. An example of this would be a high range car that is equipped with a GPS navigation system with touch screen where the route can be seen, destination routes can be created, favorite places can be seen. While a low range car would not have most of these details and therefore ECU would only have some functions to sense and control. Even if the user may privately acquire a screen, a satellite tracer, an engine control system, a camera system and others, said devices do not have the distinctive feature of being able to link to one another them and share their information for a certain event that requires to be registered or sent to a certain place.

In order to solve the problem, in the present patent of invention we offer a control device that can receive multiple connections from different external devices and may further send information to each of them or outwards the place it is installed, where it may also have the possibility of working as a radio beacon, that is, emitting a signal that can be "seen" by other nearby devices. The device is made up of a wifi or Bluetooth type connection to be able to perform all above-mentioned and at the same time has a CAN type input, for being able to link with the vehicle ECU and interact as a further sensor or actuator of all the vehicle system. Furthermore, it has a memory that registers events as desired, with the addition of a backup battery to prevent the loss of events in case of an electric problem in the vehicle.

BACKGROUND OF THE INVENTION

So at present there is no Vehicle control device and wireless communication network that allows the integration and link of several devices with each other, forming networks that allow sharing information with each other and achieve controllability and monitoring of variables that are included within the environment of said vehicle.

In particular, the following were found in the prior art.

U.S. Pat. No. 7,813,843B2 describes an Ad-hoc mobile IP network for intelligent transportation system. It provides a method for intelligently managing a transportation network. The method may include providing a roadside apparatus 18 to communicate with nodes 14A to 14D associated with vehicles 12A to 12O in a transportation network, the vehicle nodes being in a neighborhood range of the roadside apparatus. The roadside apparatus may dynamically detect the presence of a node 14A associated with a first vehicle 12A, and establish a mobile Internet Protocol (IP) network between the roadside apparatus and the first vehicle's node. The roadside apparatus 18 receives, in real-time, from the first vehicle's node 14A event data of events associated with the first vehicle 12A over the mobile IP network. The roadside apparatus 18 or nodes 14A to 14D may further receive or transmit real-time command data to control subsystems of a vehicle. Instead, the present invention provides a control device (vs. method) on board of a vehicle to generate an internal and external wireless network at the same time.

In said antecedent (Col. 2 Line 46) the vehicles included may be automated transportation, such as passenger cars and Sport Utility Vehicles (SUV), motorcycles, buses, trucks and vans. Instead, the present invention provides a more comprehensive use, including at the same time different types of load to be transported, being able to link, any transport vehicle with it, such as a trailer with a specified load, a container, a truck trailer, specific load of a vessel. That is to say that the control device may work and be installed in any means of transport, either land, sea and/or air.

In an example embodiment of the antecedent (Col. 3 Line 37), the wireless IP network 16 formed by each of the mobile wireless nodes and the combination of mobile wireless nodes 14A to 14B may further be in communication with an optional roadside apparatus 18, for example, a wireless access server or a router. In contrast, in the present invention, as the control device can work as router and node at the same time, if the connectivity to a server or to any other device that is far from the coverage area where the control device is placed is necessary, it can be connected (thanks to the internal network that is formed between the internal devices of the vehicle) to a module that allows a connection with the cloud thus reach any desired place with the information.

In the antecedent (col, 5 line 57) a mobility module 46 may be further used, in an example embodiment, in combination with the processing module 42, to calculate the velocity and/or acceleration of the vehicle in specific time intervals. Instead, in the present invention, in order to calculate the velocity and/or acceleration of the vehicle, the control device may take or analyze this information directly from the vehicle unit (ECU) through the CAN connection or it can be connected to a cell phone where these data can derive from its own hardware, or even GPS and/or acceleration modules can be annexed wirelessly, and that the control device itself makes the calculation. Or even any other device that provides these data, wirelessly, and the control device handles the retransmission to a particular destination.

In the antecedent (Col. 5 line 55) the node or communication unit 14A may also include a monitoring module 48, a collection of sensors that monitor and sense the surrounding environment, or the like that may include, for example, a radar unit 68, a laser range unit 70, a video unit 72 and a weight unit 74. In contrast, in the control device herein provided, any of the mentioned sensors and all those that want to interact to make a report or calculate any variable or even an ongoing monitoring, apart from being able to take and analyze this information may be the same sensors that the unit already has and in this case it will take them directly from the vehicle unit (ECU) through the CAN connection, but it may also be annexed may be added wirelessly and therefore form an internal network in the vehicle, being able to also share the information between the devices that are interacting with the Router Vehicular (RV). Instead, the antecedent cannot form an internal network of related devices.

On the other hand, we found patent document CN106652437A, that claims a comprehensive real-time command intelligent traffic management and control system. Said invention discloses a comprehensive real-time command intelligent traffic and management and control system and related to the field of intelligent traffic management and control. According to the system, a traffic management and control system and a transport means supervision system are in real-time mutual connection through a communication network by utilizing an internet manner. The traffic management and control system comprises a computer network system, a storage system, a monitoring system, an intelligent guide system, a check system, a communication network system, an authentication system, an identity information system, an assessing system and a power supply system. The operating method comprises the following steps: acquiring related data information of transport means in real time, performing correlation calculation, analyzing and optimizing a traffic passage scheme; and allocating related traffic routes according to the transport means performance and/or driving skills of drivers, According to the system disclosed by the invention, the traffic passage is subjected to comprehensive, real-time, dynamic and intelligent guidance, the drivers can be strictly managed and controlled in an all-around manner, and the traffic accident rate is reduced to the lowest, so that the illegal and unlawful behaviors are effectively inhibited, and the traffic safety is not influenced by severe weather and unfamiliar road conditions.

Said antecedent describes methods focused on the traffic control and takes actions accordingly, but unlike the present invention, it does not specify the use of a hardware or a particular device. In the control device herein claimed, the possibility of monitoring specific loads, apart from sensing internal parameters of the vehicle through the connection of wireless sensors that want to connect to it and share information or through the CAN communication thereof in order to have access to parameters of the vehicle ECU and this way, according to the application required, be able to take actions. This device can function and be installed in any means of transport, either land, sea and/or air. They can also be placed in different types of loads wanted to be transported, being able to link any transport vehicle with it. This device may store all the status of the sensors and events that they can generate, without the need of being directly related with the driving or the traffic. As the control device is modular and scalable, several wireless devices can be linked to comply with a particular purpose and not depend specifically on one system, since in the antecedent the relation of device to monitor other variables that have nothing to do with the driving or the status of the traffic is not foreseen in any case.

Likewise, we found antecedent U.S. Pat. No. 6,892,131B2 that refers to a Vehicle tracking, communication and floats management. A vehicle fleet management information system for identification of location and direction of movement of each vehicle in the fleet in real-time and automatic communication directly with management offices to report its location and heading and status of predetermined events in which the vehicle may be engaged.

It offers a method depending on a server and its need of connection with it through any means (either through a telephone access line or through internet). Instead, in the present invention the control device does not depend on any dedicated server and can further work without having or depending on an external connection The control devices that are in a radio coverage of their signals, can establish links and exchange data with each other, without having to depend on a point that works as router of the information.

Finally, document U.S. Pat. No. 7,327,280B2, claims an Emergency vehicle traffic signal preemption system. An emergency vehicle traffic light preemption system for preemption of traffic lights at an intersection to allow safe passage of emergency vehicles. The system includes a real-time status monitor of an intersection which is relayed to a control module for transmission to emergency vehicles as well as to a central dispatch office. The system also provides for audio warnings at an intersection to protect pedestrians who may not be in a position to see visual warnings or for various reasons cannot hear the approach of emergency vehicles. A transponder mounted on an emergency vehicle provides autonomous control so the vehicle operator can attend to getting to an emergency and not be concerned with the operation of the system. Activation of a priority-code situation provides communications with each intersection being approached by an emergency vehicle and indicates whether the intersection is preempted or if there is any conflict with other approaching emergency vehicles. On-board diagnostics handle various information including heading, speed, and acceleration sent to a control module which is transmitted to an intersection and which also simultaneously receives information regarding the status of an intersection. Real-time communications and operations software allow central and remote monitoring, logging, and command of intersections and vehicles.

Unlike the present invention, the hardware described can be found outside the vehicle (in the street intersections). Instead, the control device can be used in different means of transport, as well as loads that are transported, but not in static places such as street intersections, traffic lights. In the antecedent, two devices are connected for the operation of the system posed, one installed in the vehicle that depends on a screen and another device that is installed in the street intersections. Instead, the present invention does not need external devices for its operation. It can be connected to other devices that are in other vehicles and are located in the signal coverage area and can this way synchronize to comply with any required action. It does not depend on a LED display, but in case screens and/or additional sensors or devices are required to comply with any particular task, these can be connected wirelessly.

Thus, unlike the antecedents found in the prior art that describe methods with specific and delimited operations, the purpose of the present invention provides a control device to be installed on board of a vehicle, automated or not, being also possible to be placed in different types of loads to be transported linked to any means of land, sea or air transport, capable of generating a wireless network internal or external to it, that allows connecting with other devices, to make control, warning, management and storage of driver's data and his driving style, load and related units in real-time, and the interrelation with other vehicles that also have the device, to notify alertness, change of parts or load allocation.

BRIEF DESCRIPTION OF THE INVENTION

The present invention refers to a vehicle control device that includes a microcontroller, a wifi/bluetooth device, a voltage stabilizer circuit and a voltage protector circuit, a battery and a battery charge control circuit, an analogue-digital can bus adapter circuit of transceiver type, an optical-digital signal adapter, a radiofrequency (rf) module, an external antenna adapter circuit and a non-volatile memory (read only memory-rom) that allows the generation of an internal and an external wireless network at the same time and connection with other devices, to make control, warning and storage of driver's data and his driving style, his load and related units in real-time, and the interrelation with other vehicles that also have the device, for communication.

DESCRIPTION OF THE DRAWINGS

In the interest of clarity and ease of understanding of the purpose of the present invention, it has been illustrated in many figures in which it has been represented in one of the preferred embodiments, all by way of example, wherein.

DETAILED DESCRIPTION OF THE PURPOSE OF THE PRESENT INVENTION

The present invention refers to a vehicle control device and wireless communication network.

In order to ease comprehension of the present invention so that it can be easily implemented, the following paragraphs include an accurate description of one of the preferred embodiments, referring to the illustrative drawings enclosed, everything by way of example but not limited to it, and which components can be selected from the different equivalents without departing from the principles established in the present documents.

Figure 1:
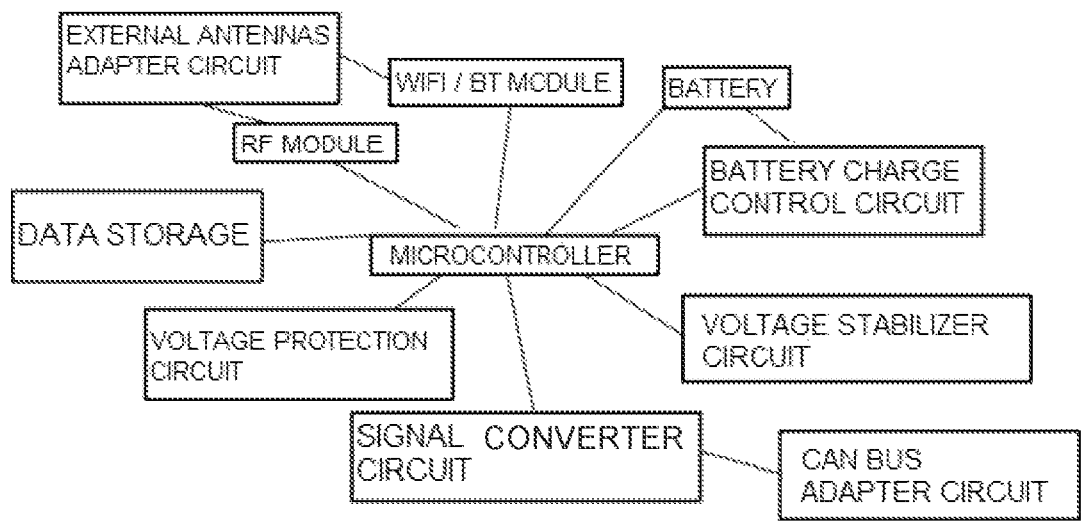
FIG. 1 is a view of the control device purpose of the present invention.
Figure 2:
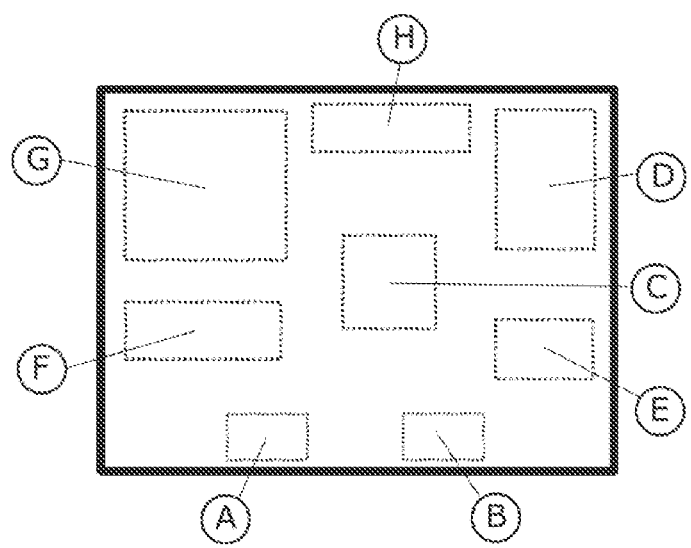
FIG. 2 is an upper view of the control device, wherein the different operating blocks that form the general control board can be seen with the following references: A) voltage protector circuit and voltage regulator circuit; B) signal adapter circuit and CAN BUS adapter circuit; C) microcontroller; D) battery; E) battery charge control circuit; f) radiofrequency circuit; G) circuit with WIFI/BLUETOOTH modules; H) antennas adapter circuit.
Figure 3:
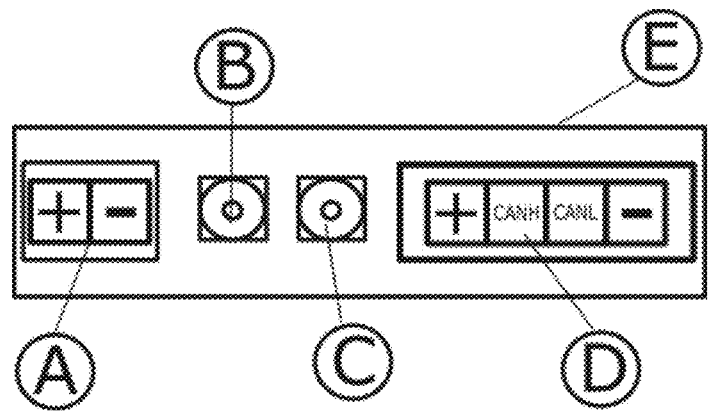
FIG. 3 shows a side view of the control device with it different parts, according to the following references: A) power input; B) external antenna connector for radiofrequency circuit; c) external antenna connector for WIFI/BLUETOOTH module; D) CAN BUS connector; E) control device casing.

The device purpose of the present invention consists of a circuit board named GENERAL CONTROL BOARD (hereinafter, GCB) that includes different electronic circuits that make to the operation of said device (according to FIG. 1), that is: a MICROCONTROLLER, in charge of leading all the operation of the control device, make connections, manage data of other connected devices, distribute the information to other devices, among others; a WIFI/BLUETOOTH MODULE (hereinafter, BT), that can include a module with wifi connectivity and another module with Bluetooth connectivity or even only one module that includes both technologies together; in charge of forming all the connections that are required according to the working mode selected. It is connected together with a microcontroller, so that at all times they are sharing information and in complete control to make any action required. A VOLTAGE STABILIZER CIRCUIT. As the control device has an power input, it needs to be adapted and regulated for the correct operation of the components for the GCB; this way, this stabilizer circuit adapts and regulates the necessary voltages for the microcontroller, the wifi/bt module block, the radiofrequency module block (hereinafter) and the battery control circuit block. A VOLTAGE PROTECTION CIRCUIT, that protects the GCB from surges or even polarity inversions, being well known that the way of destroying electronic devices included in a vehicle consist of applying them higher voltages than the one they support. A BATTERY, that feeds the GCB in case of absence of a main voltage input. A BATTERY CHARGE CONTROL CIRCUIT, that has the function of always having the battery charged, so that whenever it is left without the main supply, the GCB is always supplied in such a way that its operation will not be hindered until its battery is exhausted; at the same time, it is in charge of maintaining its voltage level. AN ANALOGUE-DIGITAL CONTROLLER AREA NETWORK (CAN BUS) ADAPTER CIRCUIT (TRANSCEIVER), that includes a transceiver type apparatus (in English, transceiver), that adapts the signals for its correct operation, operated by the microcontroller. A DIGITAL-OPTICAL SIGNAL CONVERTER, for the protection of the device circuits that converts an electric signal in an optical signal, electrically isolating the circuit that includes the can connection with the microcontroller in charge of its operation. With this type of guard, the entrance of high voltage or any non-desired voltage level that can damage the microcontroller is prevented. A RADIOFREQUENCY MODULE (RF), formed by a radiofrequency transmitter/receptor that works at a frequency different from the one of the Bluetooth and wifi technologies. It is operated the microcontroller and is in charge of transmitting all the messages required to be captured by another device that is within the coverage range. This module does not form part of the network that generates the WIFI/BT circuit, acting only in face of necessity. In case there is a need of increasing the coverage radio of the wireless signals, both WIFI/BT and RF, an EXTERNAL ANTENNAS ADAPTER CIRCUIT is available, that is in charge of adapting the radio signals into impedances so that they can achieve greater ranges. Lastly, there is a DATA STORAGE DEVICE that is in charge of storing all that is needed to have the equipment data history. It is controlled by the microcontroller that is in charge of writing the memory as required.

The device object of the present invention, has the characteristics of being modular and scalable. Modular, as it is linked with devices internal and external to the unit that carry out a specific function and at the same time allow the sharing of information among them. Scalable, since it allows the adding of the amount of devices desired, and further allows the interconnection with a second or more control devices which allows greater scalability.

As the main purpose of the present invention is to integrate and relate several devices among them, forming this way networks, that allow sharing information with each other and reaching controllability and monitoring of variables that can be found in the environment of the vehicle. Said connectivity can be made within a vehicle and with the devices included in it locally (internal network) or even be connected to devices that can be found outside the vehicle (external network). This type of connection in external manner with other devices, allows that, in case of theft of the vehicle, and taking into account the use of the GPS signal and/or mobile data annulling, the control device can work as a radio beacon, that is, emitting a signal at a determined frequency to be captured by other vehicle that is circulating close to it. Therewith, the vehicle that captures the signal, will know that the issuer is in a distress situation, being able to identify it and inform the location of the stolen or in distress situation vehicle that has its signals, or part of them, annulled.

To that effect, the device object of the present invention can generate at least three different working or operation modes, a) Complete Connectivity Mode; b) Independent Connectivity Mode; and c) Integrated Connectivity Mode.

Figure 4:
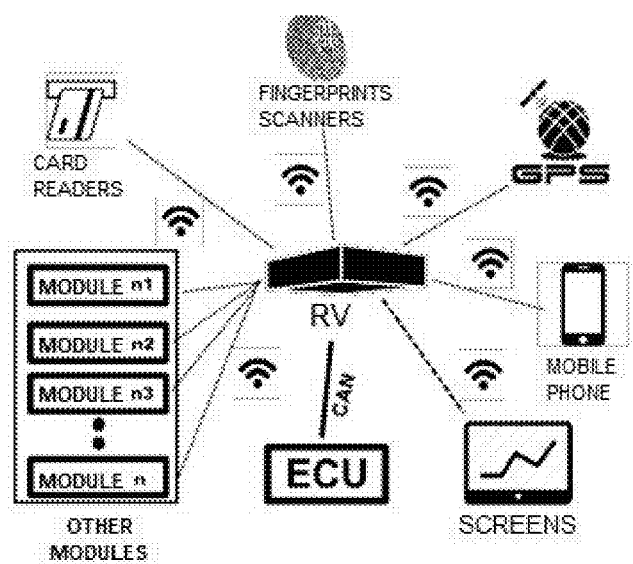
FIG. 4 represents a control device in its Complete Connectivity Mode.

In its COMPLETE CONNECTIVYT MODE, it is connected through the CAN BUS to the ECU of the vehicle, allowing the collection of data, and this way being able to perform the actions required by the user. This mode of working allows the relation of the ECU of the vehicle with all the devices that are connected to the control device, with the corresponding authorizations (see FIG. 4).

Figure 5:
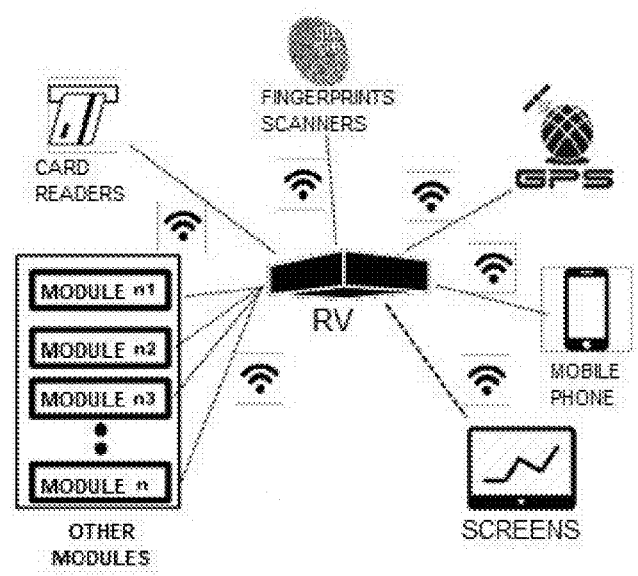
FIG. 5 represents a control device in its independent connectivity mode, wherein it can be appreciated working without relation with ECU.

The INDEPENDENT CONNECTIVITY MODE, foreseen for cases in which the control device does not have connectivity with the ECU of the vehicle, and consequently the can bus is not connected. In this working mode, all the devices are related wirelessly and sharing data with each other, where the control device is in charge of storing the data, providing the information required and that has been previously stored in the memory, establish forms or modes of operation for a desired activity, among others (see FIG. 5).

Finally, the INTEGRATED CONNECTIVITY MODE, foresees the integration of the control device within an original ECU of the unit, forming part thereof in its inner part and complying with the working mode of complete connectivity since it can internally interconnect to the can bus or can even work with independent connectivity without the need of any type of interconnection with it, but forming part of the same physical device.

JOINT MODE WORK. The control device is identified with a vehicle, is related to its ECU and with another or more control devices integrated to possible modules within the vehicle. This way, the user can interact between all the modules without depending on passing through one in particular. Such as in the case wherein a GPS module is only connected to the SIM module. In this way the GPS-SIM route would be adopted. On the contrary, the route would have been GPS-ECU-SIM control device.

Figure 6:
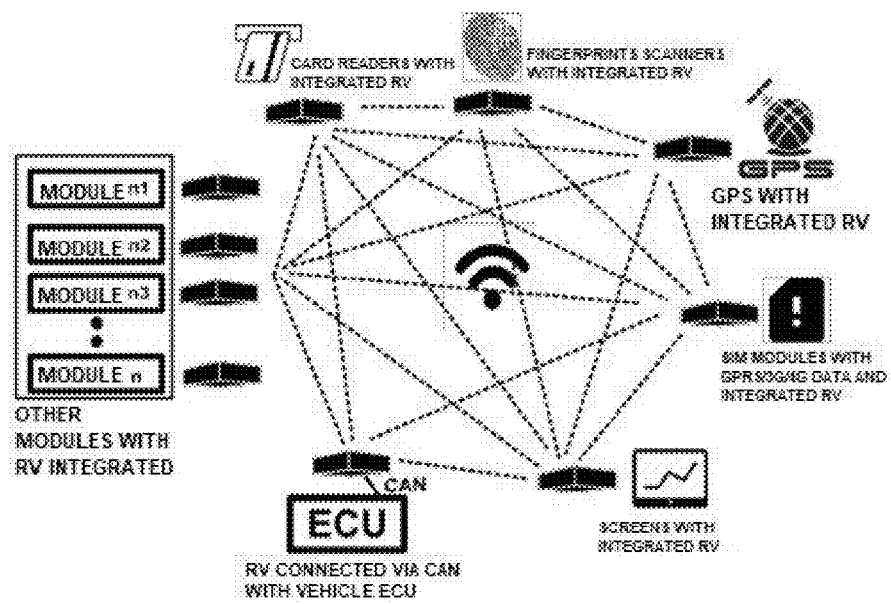
FIG. 6 represents a control device in its Joint Mode.

RELATION WITH OTHER DEVICES. The way of interacting of the control device with other devices is through the WIFI/BT module, that forms an Access Point (hereinafter, AP) for all the units that have this type of wireless connectivity. Upon connection, the control device can relate the information of all of them with each other, also having the possibility of storing or creating registrations in its internal memory. Apart from establishing an access point, the control device can also work in Station Mode (hereinafter, STA), to connect to other access points that are all within the coverage radio. As it can work in the AP and STA modes, it allows the creation of a MESH type internal or external network, with which the distribution of the information would improve since it will not depend on just one access point. Any device having wifi or Bluetooth type wireless connectivity could be linked, such as mobile phones devices, GPS modules, vehicle internal screens, card readers, fingerprints scanners, SIM modules with GPRS/3G/4G/5G data, data satellite link modules, video cameras, additional alarm systems, tyres pressure status displays, axle loading displays, tyres automatic gauges according or not to the load, among others (see FIG. 6).

Figure 7:
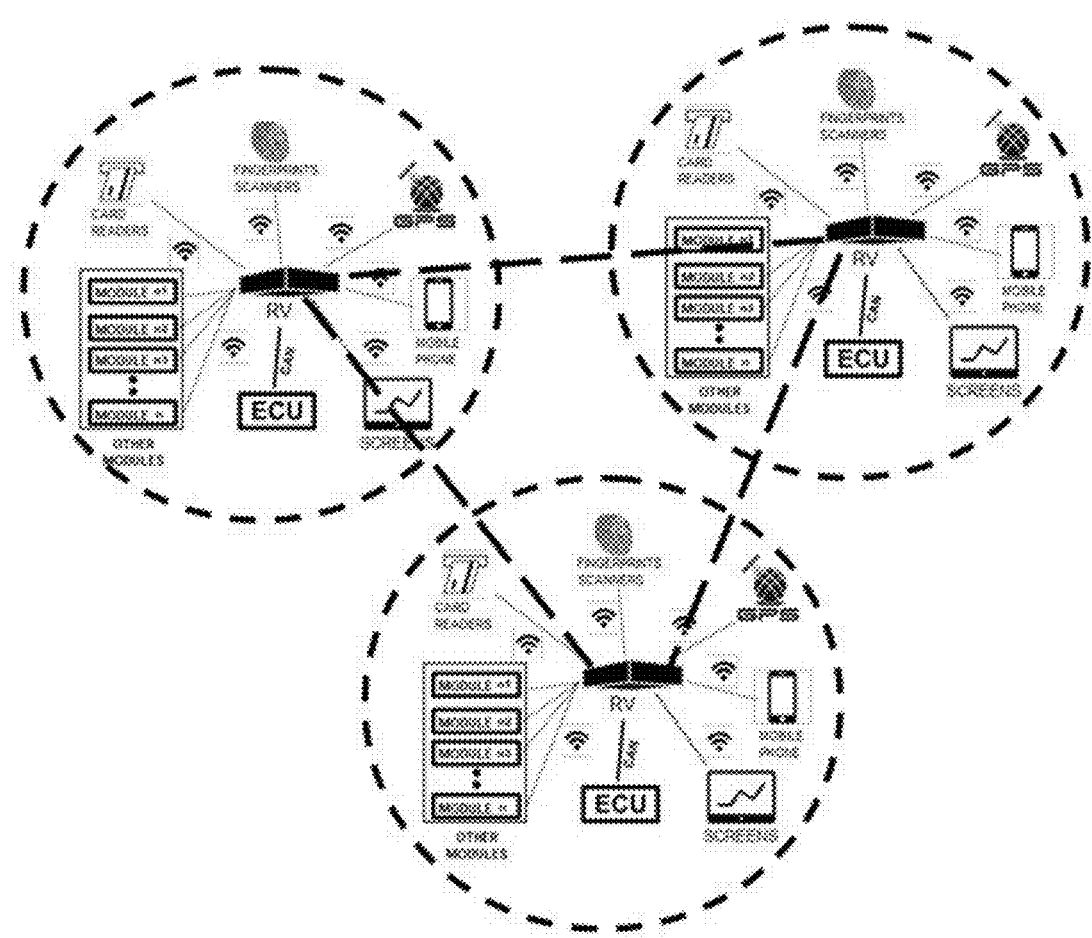
FIG. 7 shows a scalability mode of the purpose of the present invention.
Figure 8:
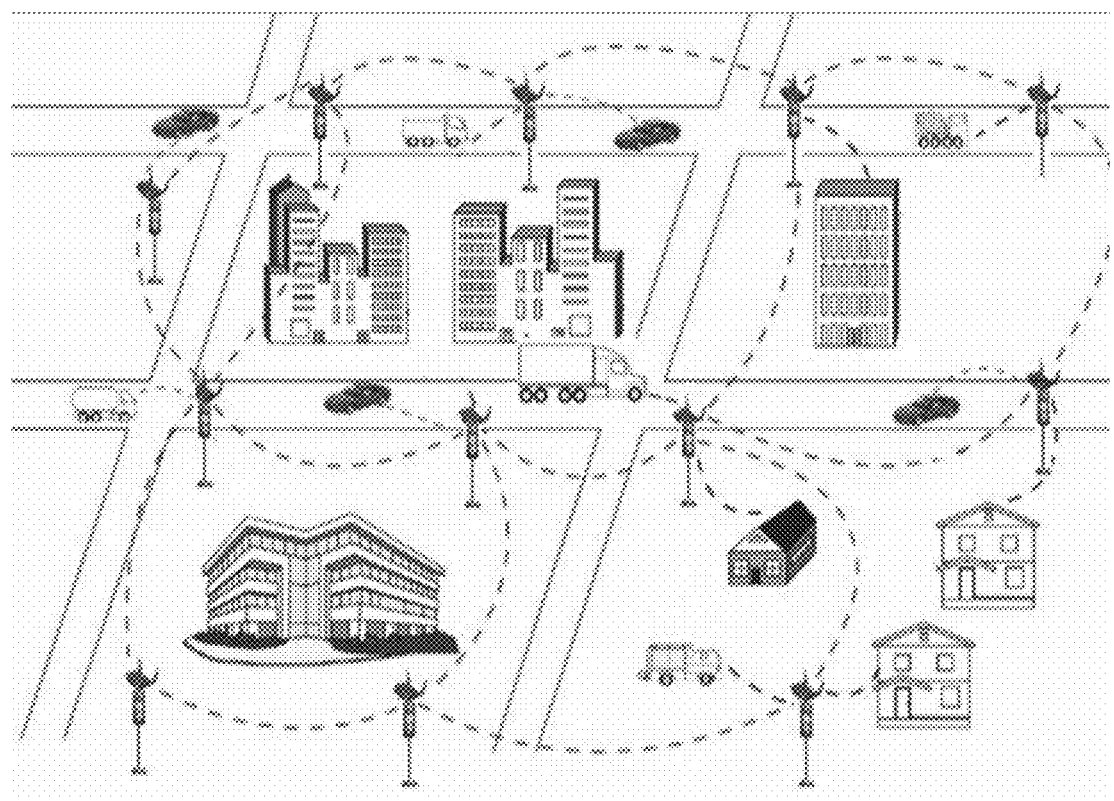
FIG. 8 shows different control devices interconnected with other external devices.

The control device working from the basic modes or joint mode can linked with other close control devices, forming this way an internal network with other devices connected to the last controlled device mentioned. As can be seen in FIG. 7, with a MESH type network format, many control devices can share all the information with each other. This device also has the capacity of establishing connections with other devices that do not form part of the internal network of the vehicle, that is, that it can receive connections from devices that are external to it and that, for example, are found in the public road. In particular, the control device could form an internal network with other control devices as can be seen in FIG. 7, but will also have the possibility of establishing a connection external to it with other devices that are in the coverage area, as can be seen in FIG. 8.

The control device can be installed in vehicles that are automated or not, and can be placed in different types of loads to be transported, being able to link, any transport vehicle with it, such as a trailer with a specified load, a container, a truck trailer or a specific load of a vessel. That is, it can work and be installed in any means of transport, either land, sea and/or air.

It is therefore the purpose of present invention a vehicle control device and wireless communication network that can generate a wireless network internal or external to it, that allows the connection with other devices, to make control, warning, management and storage of driver's data and his driving style, his load and related units in real-time, and the interrelation with other vehicles that also have the device, for communication.

The invention claimed is:

1. A vehicle control device comprising the following elements:
    a microcontroller,
    a wifi/bluetooth device,
    a voltage stabilizer circuit,
    a voltage protector circuit,
    a battery,
    a battery charge control circuit,
    an analogue-digital controller area network (CAN BUS) adapter circuit including a transceiver,
    an optical-digital signal adapter,
    a radiofrequency (rf) module,
    an external antenna adapter circuit,
    a non-volatile memory,
    wherein the vehicle control device generates an internal wireless networks and an external wireless network, the external wireless network connects with external wireless networks of other vehicle control devices located on moving vehicles with a signal coverage area, the external wireless networks share information between the vehicles, and
    wherein all of the elements of the vehicle control device are linked together forming the internal wireless networks to directly relay information to each other to control and monitor the operation of the vehicle.

2. The vehicle control device according to claim 1, wherein the vehicle control device is installed directly on the vehicle or on a product to be transported be the vehicle.

3. The vehicle control device according to claim 1, wherein in the internal wireless networks, the connection is made within the vehicle and with the elements inside the vehicle.

4. The vehicle control device according to claim 1, wherein in the external wireless network, the connection is made with the devices located outside the vehicle.

5. The vehicle control device according to claim 1, wherein the vehicle control device operates on different modes of operation, including a complete connectivity mode, an independent connectivity mode, an integrated connectivity mode, and a joint mode.

6. The vehicle control device according to claim 1, wherein the vehicle control device is modular and scalable.

7. The vehicle control device according to claim 1, wherein through the wifi/bluetooth device, the vehicle control device is connected with the other elements, the vehicle control device establishes an access point and works in a station mode.

* * * * *